(12) United States Patent
Hirai et al.

(10) Patent No.: US 7,416,625 B2
(45) Date of Patent: Aug. 26, 2008

(54) RUBBER STRIP, METHOD FOR MANUFACTURING TIRE AND TIRE COMPONENT MEMBER USING SAME, AND APPARATUS THEREFOR

(75) Inventors: Nobuyuki Hirai, Kodaira (JP); Kenji Yamada, Kodaira (JP); Katsuto Koyama, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 154 days.

(21) Appl. No.: 10/380,109

(22) PCT Filed: Mar. 26, 2002

(86) PCT No.: PCT/JP02/02927

§ 371 (c)(1),
(2), (4) Date: Mar. 11, 2003

(87) PCT Pub. No.: WO02/078939

PCT Pub. Date: Oct. 10, 2002

(65) Prior Publication Data

US 2004/0013754 A1   Jan. 22, 2004

(30) Foreign Application Priority Data

Mar. 29, 2001 (JP) ............................. 2001-096875
Apr. 27, 2001 (JP) ............................. 2001-132163

(51) Int. Cl.
*B29D 30/14* (2006.01)
*B29D 30/60* (2006.01)

(52) U.S. Cl. .................. 156/117; 156/130; 156/130.3

(58) Field of Classification Search ................. 156/117, 156/397, 130, 408, 421, 130.3; 428/156, 428/157, 192
See application file for complete search history.

(56) References Cited

U.S. PATENT DOCUMENTS

| 1,728,511 | A | * | 9/1929 | Scrote | 156/408 |
|---|---|---|---|---|---|
| 2,321,163 | A | * | 6/1943 | Sternad et al. | 156/410 |
| 2,346,439 | A | * | 4/1944 | Leguillon | 156/405.1 |
| 2,734,553 | A | * | 2/1956 | Rawls | 156/96 |
| 2,828,797 | A | * | 4/1958 | Vanzo et al. | 156/402 |
| RE25,349 | E | * | 3/1963 | Hanson | 156/130 |
| 3,251,722 | A | * | 5/1966 | Holman | 156/130 |
| 3,523,854 | A | * | 8/1970 | Cantarutti | 156/397 |

(Continued)

FOREIGN PATENT DOCUMENTS

EP    A-0 873 852    10/1999

(Continued)

*Primary Examiner*—Geoffrey L Knable
(74) *Attorney, Agent, or Firm*—Oliff & Berridge, PLC

(57) ABSTRACT

A green tire or a tire component member is built by winding and laminating a rubber strip having a cross section in which at least one edge viewed in the width direction has a thickness that is substantially zero, and thickness of the rubber strip gradually decreases in a width direction from a maximum thickness position nearest to the edge to said edge, or a projection of a stepped portion of the green tire or the tire component member built by winding and laminating the rubber strip is flattened under pressure, so that the green tire is prevented from producing residual air and a saw blade like surface. Therefore, occurrences of residual air, bare, a flow crack or embedded contaminant in a product tire can be suppressed to enhance the durability of the tire.

5 Claims, 11 Drawing Sheets

U.S. PATENT DOCUMENTS

| | | | |
|---|---|---|---|
| 3,789,899 A | | 2/1974 | Kobayashi |
| 4,240,863 A | * | 12/1980 | Vinton ........................ 156/361 |
| 4,283,241 A | * | 8/1981 | Hollmann ................... 156/117 |
| 4,551,806 A | * | 11/1985 | Storace et al. .............. 156/397 |
| 5,935,377 A | | 8/1999 | Sergel et al. |

FOREIGN PATENT DOCUMENTS

| | | |
|---|---|---|
| EP | A-1 020 284 | 7/2000 |
| EP | A-1 033 218 | 9/2000 |
| EP | A-1 033 236 | 9/2000 |
| JP | A 7-47617 | 2/1995 |
| JP | A 9-29856 | 2/1997 |
| JP | A 11-510750 | 9/1999 |
| JP | A 2000-108222 | 4/2000 |
| JP | A 2000-246812 | 9/2000 |
| JP | A 2000-289122 | 10/2000 |
| JP | A 2001-191423 | 7/2001 |
| WO | WO 97/06967 | 2/1997 |

* cited by examiner

RUBBER STRIP, METHOD FOR MANUFACTURING TIRE AND TIRE COMPONENT MEMBER USING SAME, AND APPARATUS THEREFOR

TECHNICAL FIELD

The present invention relates to a rubber strip to be spirally wound on a rigid core or a tire building drum for building a green tire, or on a tire component member forming drum for forming a tire component member, and method for manufacturing a tire or a tire component member using the rubber strip and an apparatus for the method. Specifically, the present invention prevents a product tire from causing residual air, bares, flow cracks or the like, thereby realizing an improvement of the durability of the product tire.

BACKGROUND

In recent years, a method for manufacturing a tire has been proposed, in which a green tire is built by winding and laminating a rubber strip on a rigid core or a tire building drum, in order to realize a smaller production unit which does not need preparation of tire component members such as bead filler, belt and tread prior to building a tire so as to reduce process manpower and time, as well as to eliminate production equipments for such tire component members, thereby saving space for such equipments,.

In this method, however, when the green tire is built by winding and laminating a rubber strip on the rigid core or the tire building drum, a stepped portion occurs between one part of the rubber strip and another part of the rubber strip overlapped thereon. During vulcanization of the green tire, the stepped portion formed from a tire crown section to a bead section cannot be sufficiently molded, so that bares and flow cracks may be present in the product tire, which cause problems of deteriorating the durability and an appearance of the product tire.

Moreover, air retained at the stepped portion in the tire does not escape but still remains during the vulcanization. Air enclosed between a surface of the tire at the stepped portion and a tire vulcanizing mold also remains in the tire as it is incorporated by a rubber flow during the vulcanization. As a result, there is a problem in using the product tire that, as stress concentrates at the air-remaining portion, the air-remaining portion is likely to have cracks as compared with the rest of the tire so that good the durability cannot be realized.

Further, a contaminant such as a mold-releasing agent easily deposits on the stepped portion formed at the sidewall. Thus, when the tire is expanded by the vulcanization, the contaminant pinched between the surface of the rubber and the mold is pressed into the rubber to make an contaminants-embedded portion on the surface of the product tire. This may also result in occurrences of the cracks, so that good the durability cannot be achieved.

In contrast to the above-mentioned method, there has been known a method for building a tire in which each tire component member such as bead filler, belt and tread is separately formed prior to building the green tire, and then these tire component members are bonded one another on the drum to build a desired green tire. For the production of the tire component member used in this method, a method has been also proposed in which the tire component member is built by winding and laminating a rubber strip on a tire component member forming drum.

When the tire component member such as bead filler is laminated by winding the rubber strip on the tire component member forming drum according to this proposal, a stepped portion is, however, made between one part of the rubber strip and another part of the rubber strip overlapped thereon, so that, as mentioned in the above, there is a problem of bare, remaining air and embedding of the contaminant during the tire vulcanization, which may cause a crack.

With reference to FIGS. 10-13, what has been described above is more specifically exemplified. FIG. 10 is a sectional view showing a green tire built according to the conventional production method. In the building of the green tire 90, an inner liner 91, a carcass layer 92, beads 93A, 93B, a sidewall 94 and belt layer 95A, 95B are formed, and subsequently a rubber strip 97 is helically wound and laminated to form tread 96.

The rubber strip 97 for forming the tread 96 generally has a flat rectangle cross section as shown in FIG. 1a. FIGS. 12a and 12b are cross-sectional views showing details of portions a and b of FIG. 10, respectively. In the building of the green tire, the rubber strip 97 having rectangle cross section are wound and laminated in such a manner that the laminated rubber strips are inclined and stepwise, a space remains between the sidewall 94 which has been already bonded and built and the stepped portion of the rubber strip 97 of the tread 96 as shown in FIG. 12a. The space retains air in the product tire and causes a decrease in the durability due to a stress concentration. The outer surface of the tread 96 is also formed like a saw blade as shown in FIG. 12b by means of the stepped portion of the rubber strip 97, which cause the above-mentioned bares, flow cracks and the like.

In order to solve the problems, in Japanese Patent Application Opened No. 2000-254980, it is proposed to use a rubber strip 99 having a cross section as shown in FIG. 11b. The rubber strip 99 is provided with a maximum thickness portion 99a and an edge rubber portion 99b having a rectangle cross section whose thickness is smaller than that of the maximum thickness portion 99.

FIGS. 13a and 13b are cross-sectional views showing details of parts of tread 96 of a green tire 90 corresponding to parts a and b of FIG. 10, respectively, which is built by winding and laminating the rubber strip 99 having the edge rubber portion 99b instead of rubber strip 97 shown in FIG. 10. In the rubber strip 99, the edge rubber portion 99b also has a rectangle cross section, so that, when the rubber strip 99 is inclined, wound and laminated, a space is formed and remains at a stepped portion near the edge portion 99b having a rectangle cross section and, therefore, an occurrence of residual air is inevitable. The outer surface of the tread 96 cannot be sufficiently smoothened since the edge rubber portion 99b having a rectangle cross section is stepwisely laminated as shown in FIG. 13b. Thus, it does not solve the problem of occurrences of bares, flow cracks and embedded contaminants due to the saw blade-like surface.

The present invention is directed to solve these problems which the conventional art has, and the object of the present invention is to provide a rubber strip for improving the durability of a product tire by reducing residual air and an amount of a step in a stepped portion formed with one part of the rubber strip and another part of the rubber strip overlapped thereon prior to vulcanization so as to suppress problems in the product tire which are likely caused by occurrences of bare and a flow cracks, residual air and embedded contaminants, and a method for manufacturing a tire and a tire component member using the rubber strip, and an apparatus for the method.

DISCLOSURE OF THE INVENTION

In order to achieve the above-mentioned object, the inventors firstly examined a means for optimizing a cross section of the rubber strip. As a result of an examination of factors why a conventional rubber strip forms residual air and a saw blade-like outer surface, the inventors found that the first factor is an edge of the rubber strip having a thickness of not zero, and the second factor is the thickness of the rubber strip not gradually decreasing from a maximum thickness portion to the edge. Taking a known rubber strip 99 having a shape in which edge rubber portions 99b are attached to a maximum thickness portion 99a as shown in FIG. 11(b) as an example, in the rubber strip 99, firstly, the thickness at the edge is not zero, and, secondly, the thickness stepwisely decreases from the maximum thickness portion 99a to the edge, so that a saw blade-like surface is produced as shown in FIGS. 13a and 13b.

Further, other than the above means for optimizing the cross section of the rubber strip, the inventors found that means for flattening a projection of the stepped portion formed by winding and laminating the rubber strip under pressure is effective to achieve the above-mentioned object.

The inventors further studied these findings and reached the present invention. A primary means for achieving the present invention is to optimize the cross section of the rubber strip, to flatten the projection of the stepped portion under pressure, and to optimize a method for flattening under pressure. The gist and operation are as follows.

In the following descriptions, a "building drum" refers to various kinds of building drums such as a first drum and a second former, and a "tire component member forming drum" refers to a drum for forming a tire component member separately such as a drum for bead filler.

(1)

The rubber strip of the present invention is to be helically wound on a rigid core or a building drum for building a green tire, or helically wound on a tire component member forming drum for forming a tire component member, wherein
the rubber strip has a cross section in which at least one edge viewed in the width direction has a thickness that is substantially zero, and thickness of the rubber strip gradually decreases in a width direction from a maximum thickness position nearest to the edge to said edge.

According to the rubber strip of the present invention, the rubber strip has a thickness that is substantially zero at the edge in the width direction, and the thickness gradually decreases in the width direction from a maximum thickness position to the edge, so that the above-mentioned first and second factors which the conventional rubber strip 97 or 99 has can be solved. This can enhance the durability of the product tire by preventing the residual air and forming the smooth outer surface to eliminate causes of bare, a flow crack or embedded contaminants.

Not only in the case where a green tire is build by helically winding a rubber strip on a rigid core or a building drum, but also in the case where a tire component member is built by helically winding a rubber strip on a tire component member forming drum, the same operation as mentioned in the above can be exerted.

In the above description, the expression, "the edge (of the rubber strip) in the width direction having a thickness that is substantially zero" means that the edge has a thickness that is presumed to be zero even if the thickness cannot be unavoidably controlled to be completely zero in a production of the rubber strip although it is zero in the design.

(2)

The rubber strip of this invention is according to the invention mentioned in (1), wherein the maximum thickness portion has a finite width. By means of this rubber strip, the maximum thickness portion extends in the width direction with a certain width, so that, when the rubber strip is helically wound and laminated, the rubber strip can be laminated with less gaps and further save the number of windings due to its larger cross section as compared to, for example, a rubber strip having the same thickness and width, and a trigonal cross section. Thus, it can stabilize the quality of the green tire or the tire component member in its formation can be stabilized, prevent the residual air, and contribute to an improvement of the productivity.

(3)

The rubber strip of this invention is according to the inventions mentioned in (1) or (2), wherein the maximum thickness portion has thickness of from 0.2 mm to 8 mm.

If the maximum thickness portion has thickness of less than 0.2 mm, the number of windings increases to lower the productivity. This may also cause an entrainment of the air when the strip is wound, which may lead to the residual air. On the other hand, if the maximum thickness portion has thickness of more than 8 mm, a larger step is made during the lamination of the rubber strip, so that the above-mentioned problems caused by the residual air and the saw blade like outer surface cannot be solved in some cases since the thickness drastically changes at the side portion even when a thickness of the edge in the width direction is zero.

(4)

The rubber strip of this invention according to the invention mentioned in any one of (1) to (3), wherein a side portion abutting on the maximum thickness portion and including said edge in the width direction with a thickness that is substantially zero has the width of not less than 0.2 mm.

If the side portion of the rubber strip has the width of less than 0.2 mm, the thickness drastically decreases from the maximum thickness portion to the edge in the width direction, so that the above-mentioned problems cannot be solved in some cases since a smoothly finished surface cannot be formed.

(5)

A method for manufacturing a tire according to the present invention comprises building a desired green tire by helically winding and laminating the rubber strip mentioned in any one of (1) to (4) on a rigid core or a building drum.

By means of the method for manufacturing a tire, a green tire having no residual air nor saw blade like surface can be built, thereby preventing a product tire from causing bare, residual air, and embedded contaminants, as mentioned in the above.

(6)

A method for manufacturing a tire according to the present invention comprises building a desired tire component member by helically winding and laminating the rubber strip mentioned in any one of (1) to (4) on a tire component member forming drum.

By means of the method for manufacturing a tire, a tire component member having no residual air nor saw blade like surface can be built.

(7)

A method for manufacturing a tire according to the present invention comprises building a desired green tire by helically winding and laminating a rubber strip on a rigid core or a building drum, wherein a projection of a stepped portion produced by one portion of the rubber strip and another portion of the rubber strip overlapping thereon is flattened under pressure.

By means of the method for manufacturing a tire, the projection is flattened under pressure to reduce an amount of a step of the stepped portion produced by one portion of the rubber strip and another portion of the rubber strip overlapping thereon, accompanied by suppressing problems in occurrences of bare, a flow crack, residual air, and embedded contaminant to enhance the durability of the product tire.

(8)

The method for manufacturing a tire of this invention is according to the invention mentioned in (7), wherein the projection is flattened under pressure by a flattening roll.

By means of the flattening roll, the projection is secured to be flattened under pressure.

(9)

The method for manufacturing a tire of this invention is according to the invention mentioned in (8), wherein a difference in rotational speeds between the rigid core or the building drum and the roller of the flattening roll is set to be 0-30% of a rotational speed of the rigid core or the building drum.

By setting the difference in rotational speeds to 0-30% of the rotational speed of the rigid core or the building drum, shear stress is produced in a rotational direction of the rigid core or the building drum, thereby further enhancing the flattening effect.

(10)

The method for manufacturing a tire of this invention is according to the invention mentioned in (8) or (9), wherein the rotational direction of the roller of the flattening roll is set to 0-30 degrees with reference to an extending direction of the rubber strip on the rigid core or the building drum.

By setting the rotational direction of the roller of the flattening roll to 0-30 degrees with reference to the extending direction of the rubber strip, a shear stress in the rotational direction of the roller is produced between the roller and the rubber strip, thereby further enhancing the flattening effect.

(11)

The method for manufacturing a tire of this invention is according to the invention mentioned in any one of (7)-(10), wherein the winding of the rubber strip and the flattening of the projection under pressure are performed substantially simultaneously.

The manufacturing method substantially simultaneously winds the rubber strip and flattens the projection under pressure in a single step, so that the cycle time can be decreased. In addition, the flattening under pressure is performed immediately after the rubber strip is wound, so that a good flattening effect can be exerted.

(12)

The method for manufacturing a tire of this invention is according to the invention mentioned in any one of (7)-(10), wherein, the rubber strip is wound in order to build a tire component member, the projection produced in the tire component member is subsequently flattened under pressure, and the winding and the flattening under pressure are sequentially performed for building all of the tire component members.

By means of the manufacturing method, any part of the projection of the tire component member can be intensively flattened under pressure, so that it can be suitably realized to prevent any part from an occurrence of bare, residual air and embedded contaminants.

(13)

A method for manufacturing a tire component member comprises building a desired tire component member by helically winding and laminating a rubber strip on a tire component member forming drum, wherein a projection produced by a part of the rubber strip and another part of the rubber strip overlapping thereon is flattened under pressure.

By means of this method, an amount of a step of a stepped portion produced by a part of the rubber strip and another part of the rubber strip overlapping thereon can be reduced by flattening the projection under pressure, so that, when a green tire is built with the tire component members built by this embodiment, problems possibly raised in vulcanization by occurrences of bare and a flow crack, residual air, and embedded contaminants as mentioned in the above can be suppressed to enhance the durability of a product tire.

(14)

The method for manufacturing a tire component member of this invention is according to the invention mentioned in (13), wherein the projection is flattened under pressure by a flattening roll.

By means of the flattening roll, the flattening of the projection under pressure is secured.

(15)

The method for manufacturing a tire component member of this invention is according to the invention mentioned in (14), wherein a difference in rotational speeds between the tire component member forming drum and the roller of the flattening roll is set to be 0-30% of a rotational speed of the tire component member forming drum.

By setting the difference in rotational speeds to 0-30% of the rotational speed of the rigid core or the building drum, shear stress is produced in a rotational direction of the rigid core or the building drum, thereby further enhancing the flattening effect.

(16)

The method for manufacturing a tire component member of this invention is according to the invention mentioned in (15) or (16), wherein the rotational direction of the roller of the flattening roll is set to 0-30 degrees with reference to an extending direction of the rubber strip on the tire component member forming drum.

By setting the rotational direction of the roller of the flattening roll to 0-30 degrees with reference to the extending direction of the rubber strip, a shear stress in the rotational direction of the roller is produced between the roller and the rubber strip, thereby further enhancing the flattening effect.

(17)

The method for manufacturing a tire component member of this invention is according to the invention mentioned in any one of (13)-(16), wherein the winding of the rubber strip and the flattening of the projection under pressure are performed substantially simultaneously.

The manufacturing method substantially simultaneously winds the rubber strip and flattens the projection under pressure in a single step, so that the cycle time can be decreased. In addition, the flattening under pressure is performed immediately after the rubber strip is wound, so that a good flattening effect can be exerted.

(18)

The method for manufacturing a tire component member of this invention is according to the invention mentioned in any one of (13)-(17), wherein, the rubber strip is wound, and subsequently the projection is flattened under pressure.

By means of the manufacturing method, any part of the projection of the tire component member can be intensively flattened under pressure, so that it can be suitably realized to prevent any part from an occurrence of bare, residual air and embedded contaminants.

(19)

An apparatus for manufacturing a tire according to the present invention comprises a rigid core or a building drum, a rubber strip extruder for extruding a rubber strip to be wound and laminated on the rigid core or the building drum, a rubber strip winder for winding the rubber strip on the rigid core or the building drum, and a flattening roll for flattening a projection produced under pressure by a part of the rubber strip wound on the rigid core or the building drum and another part of the rubber strip overlapping thereon.

As the apparatus for manufacturing a tire has the flattening roller, a green tire is prevented from residual air and an occurrence of a saw blade like surface, so that bare, a flow crack and embedded contaminants which may be causes in vulcanization can be suppressed to enhance the durability of a product tire, as mentioned in the above.

(20)

The apparatus for manufacturing a tire of this invention is according to the invention mentioned in (19), wherein a roller of the flattening roll has a surface provided with knurling.

By means of this apparatus, as the roller of the flattening roll has a surface provided with knurling, it is realized to improve the flattening due to a further shear stress and the further flattening effect due to a penetration action of the roller to the rubber, so that an amount of a step of the stepped portion can be reduced to further improve the durability of a product tire.

(21)

An apparatus for manufacturing a tire according to the present invention comprises a tire component member forming drum, a rubber strip extruder for extruding a rubber strip to be wound and laminated on the tire component member forming drum, a rubber strip winder for winding the rubber strip on the tire component member forming drum, and a flattening roll for flattening a projection produced by a part of the rubber strip wound on the tire component member forming drum and another part of the rubber strip overlapping thereon under pressure.

As the manufacturing apparatus has the flattening roller, a green tire is prevented from residual air and an occurrence of a saw blade like surface, so that bare, a flow crack and embedded contaminants which may be causes in vulcanization can be suppressed to enhance the durability of a product tire, as mentioned above.

(22)

The apparatus for manufacturing a tire component member of this invention is according to the invention mentioned in (21), wherein a roller of the flattening roll has a surface provided with knurling.

By means of this apparatus, as the roller of the flattening roller has a surface provided with knurling, it is realized to improve the flattening due to a further shear stress and the further flattening effect due to a penetration action of the roller to the rubber, so that an amount of a step of the stepped portion can be reduced to further improve the durability of a product tire.

BEST MODE FOR CARRYING OUT THE INVENTION

Figure 1A:
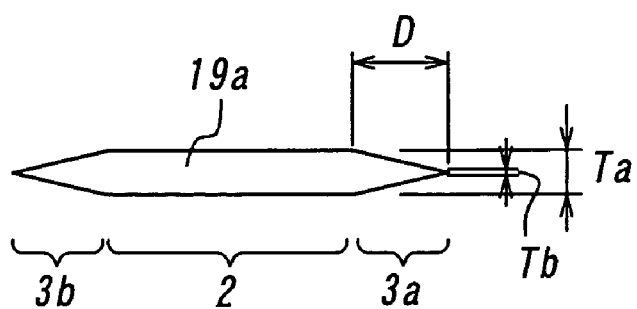
FIGS. 1a-1f are cross-sectional views of a rubber strip according to the first embodiment of the present invention.
Figure 1B:
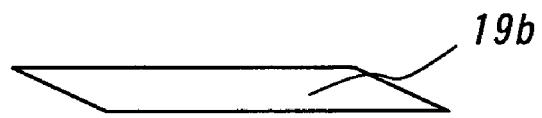
Figure 1C:
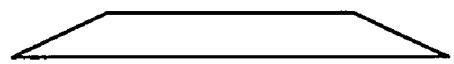
Figure 1D:
Figure 1E:
Figure 1F:
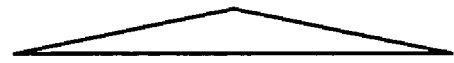
Figure 2:
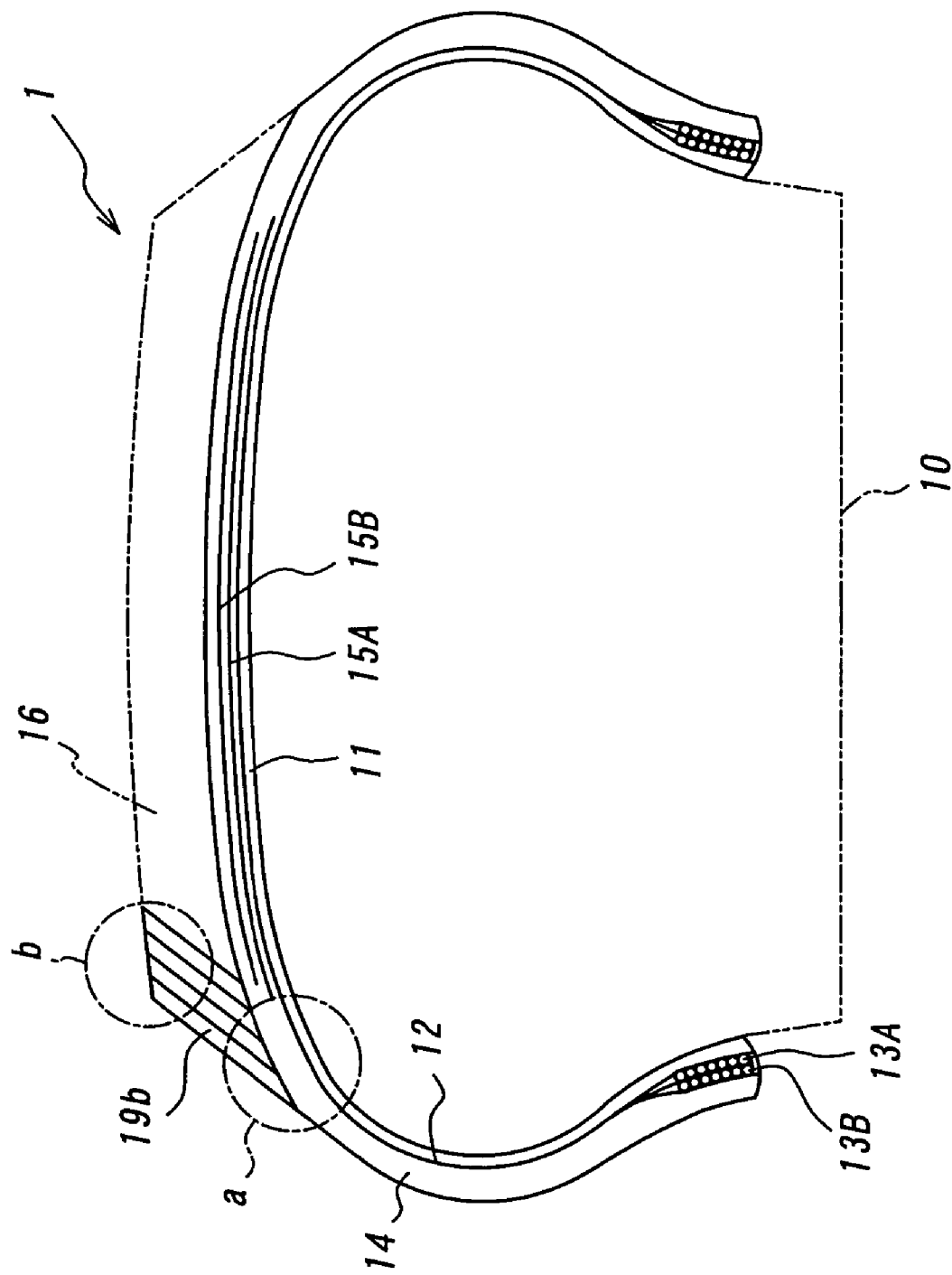
FIG. 2 is a cross-sectional view of a green tire built by winding and laminating the rubber strip shown in FIG. 1.

With reference to FIGS. 1-3, a rubber strip according to the first embodiment of the present invention and a method of manufacturing a tire using the rubber strip will be described. FIGS. 1a-1f are sectional views showing examples of the rubber strips for building tread. A rubber strip 19 having a cross section as shown in FIG. 1a is composed of a maximum thickness portion 2 having an uniform thickness and side portions 3a, 3b abutting the either side edge of the maximum thickness portion 2 and extending in the width direction. In this example, the maximum thickness portion has a thickness Ta of 0.3 mm, the side portions 3a, 3b each has a width D of 1.5 mm, the edge in the width direction has a thickness Tb of substantially 0 mm, and the thickness of the side portions 3a, 3b each gradually decreases from a side abutting the edge of the maximum portion to the edge of the side portions 3a, 3b.

The rubber strips shown in FIGS. 1a, 1b and 1c each has the maximum thickness portion having a width that is not zero. Among these rubber strips, the rubber strip 19a shown in FIG. 1a has a hexagonal cross section, and the rubber strips shown in FIGS. 1b and 1c have parallelogram and trapezoidal sections, respectively.

The rubber strips shown in FIGS. 1d, 1e and 1f each has the maximum thickness portion having a width that is zero. These rubber strips have rhomboidal, lenticular and triangular sections, respectively, as shown in each figure.

FIG. 2 is a cross-sectional view showing a cross section in the width direction of a green tire 1 in which tread 16 is built by winding and laminating the rubber strip shown in FIG. 1b. In order to build the green tire 1, the rubber strip is wound and laminated on a rigid core to attach an inner liner 11. Then, bead wires with rubber are wound to build inner bead 13A, and a carcass layer 12 is woven on it. Subsequently, an outer bead layer 13B is built in the same manner as the inner bead layer, then the rubber strip is wound and laminated to attach a sidewall 14, and two belt layer 15a, 15b are built by weaving. Finally, a rubber strip 19b is wound and laminated to build the tread 16. In the first embodiment of the method for manufacturing a tire, a product tire is produced by vulcanizing the thus built green tire 1 in a vulcanizer.

Figure 3A:
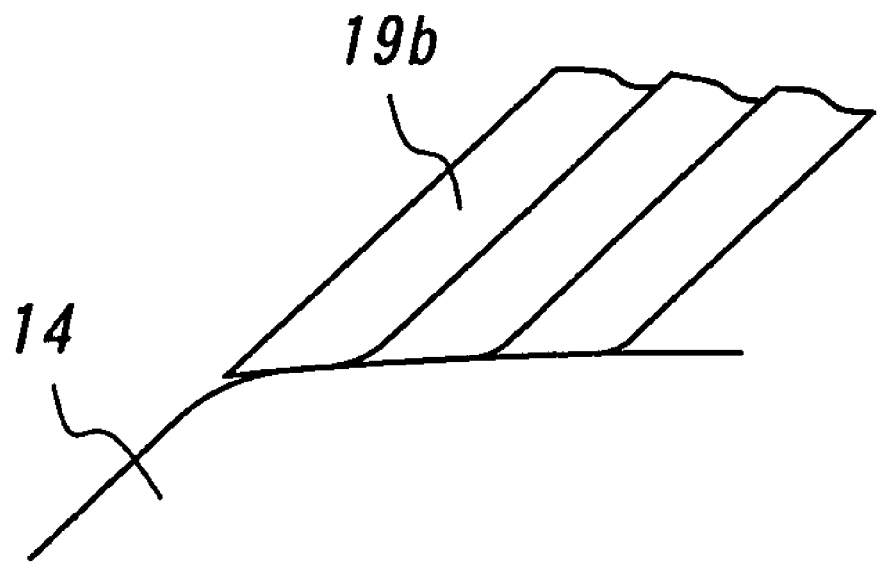
FIGS. 3a and 3b are cross-sectional views showing portion a and portion b of FIG. 2, respectively.
Figure 3B:
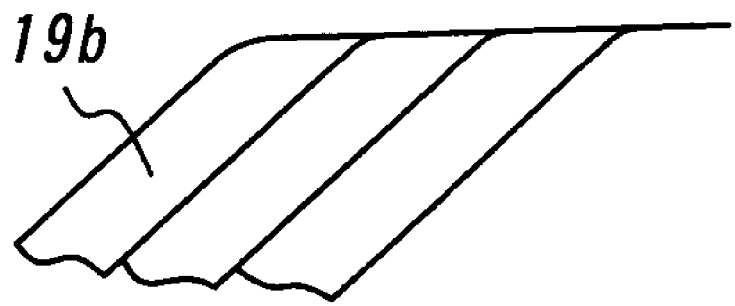

FIGS. 3a and 3b are detailed drawings showing details of FIGS. 2a and 2b, respectively. The rubber strip 19b has a thickness that is zero at its edge in the width direction and a cross section in which the thickness gradually decreases from the maximum thickness portion having the maximum thickness to the edge in the width direction, so that, when the rubber strip 19b is wound to build the green tire, unlike the above-mentioned conventional technique, a gap is not formed between the rubber strip and a pre-attached member to produce residual air. Moreover, a smooth outer surface can be formed, so that occurrences of a bear, a flow crack and residual air after the vulcanization can be suppressed, thereby preventing the durability from decreasing.

Although the descriptions are made in the above to the rubber strip for winding and laminating on the rigid core to build tread of a green, and the method for manufacturing a tire using the rubber strip, the same effect can be exerted by winding and laminating a rubber strip having a similar cross section, when the green tire is built on the building drum, or when component members other than the tread are built on the rigid core or the building drum, or even when a component member is separately built on the tire component member forming drum.

Figure 4:
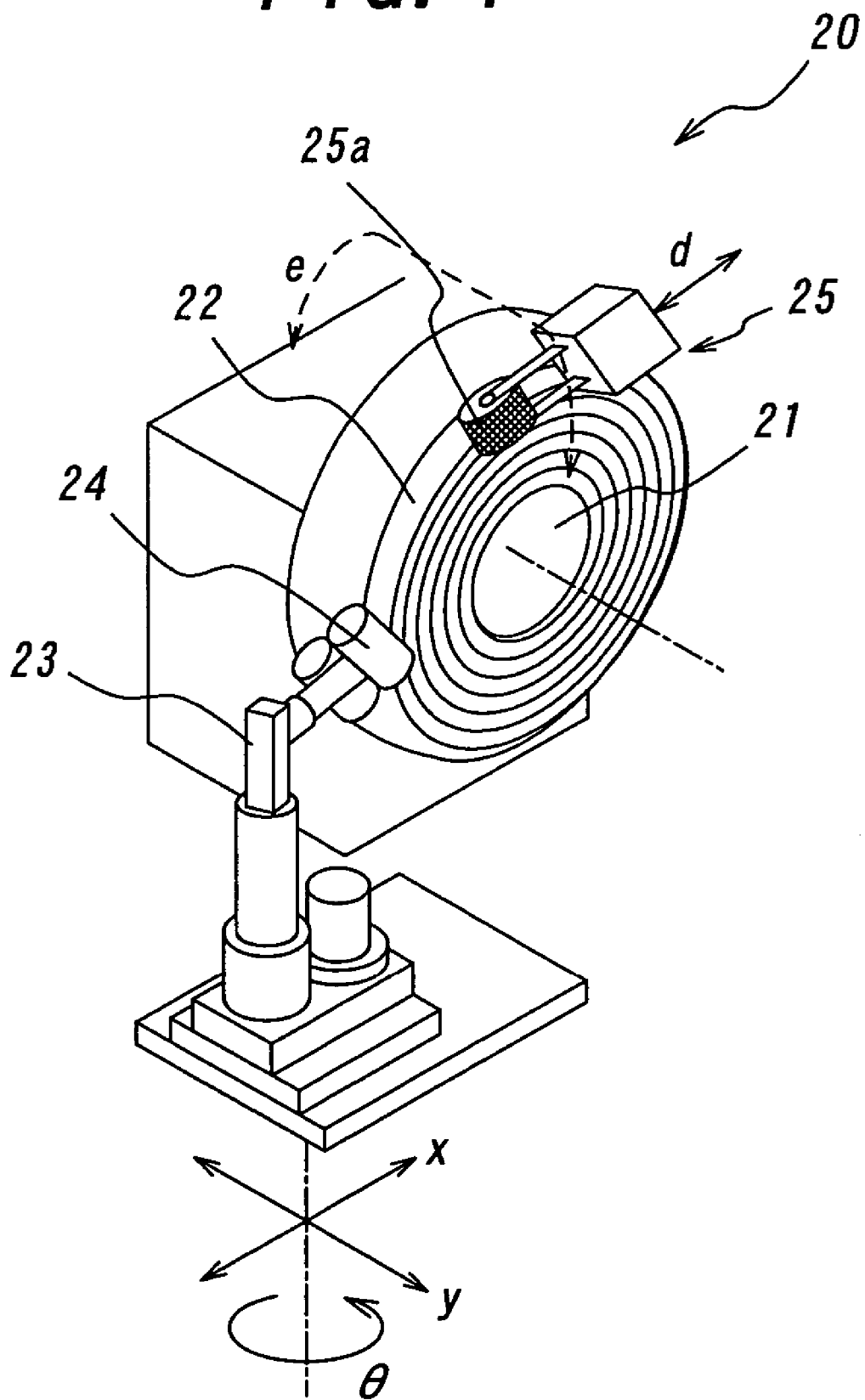
FIG. 4 is a perspective view of a green tire builder according to the second embodiment of the present invention.

With reference to FIGS. 4-7, the second embodiment of the present invention will be discussed. FIG. 4 is a perspective view of a green tire builder 10 used in the method for manufacturing a tire according to the present invention showing in a state where a side wall is to be built. The green tire builder 20 is provided with a rigid core (or a building drum) 21 for winding and laminating a rubber strip 22, a rubber strip extruder 23 for extruding the rubber strip 22, a rubber strip winder 24 for winding the rubber strip 22 on the rigid core 1, and a flattening roll 25 for flattening a projection of a stepped portion produced by one part of the rubber strip 22 wound on the rigid core 21 and another part of the rubber strip overlapping thereon under pressure. A surface of a roller 25a of the flattening roll 25 is provided with knurling.

A method for manufacturing a tire by using the above-mentioned green tire builder 20 will be discussed below. First, in a step of helically winding and laminating the rubber strip 22 on the rigid core 21, the rubber strip 22 is helically wound and laminated while the rubber strip winder 24 is moved in the directions as shown by arrows x, y, and θ in the figure so as the rubber strip winder 24 to constantly locate at a given position with reference to the rigid core 21.

In a step of flattening a projection of a stepped portion produced by one part of the rubber strip 22 wound on the rigid core 21 and another part of the rubber strip overlapping thereon under pressure, the above-mentioned projection of the stepped portion is flattened under pressure while the surface of the roller 25a of the flattening roll 25 is moved in the directions as shown by arrows d and e in the figure so as the surface of the roller 25a of the flattening roll 25 to constantly locate at a given position with reference to the rigid core 21. Then, the green tire thus built can be vulcanized to produce a product tire without residual air, bare or a flow crack.

Figure 5:
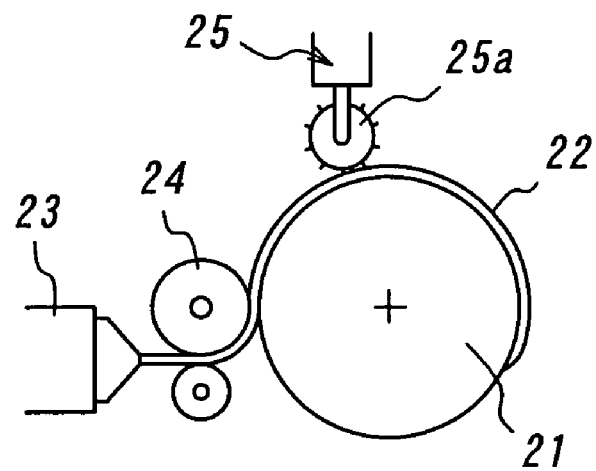
FIG. 5 is a side view of the green tire builder.
Figure 6:
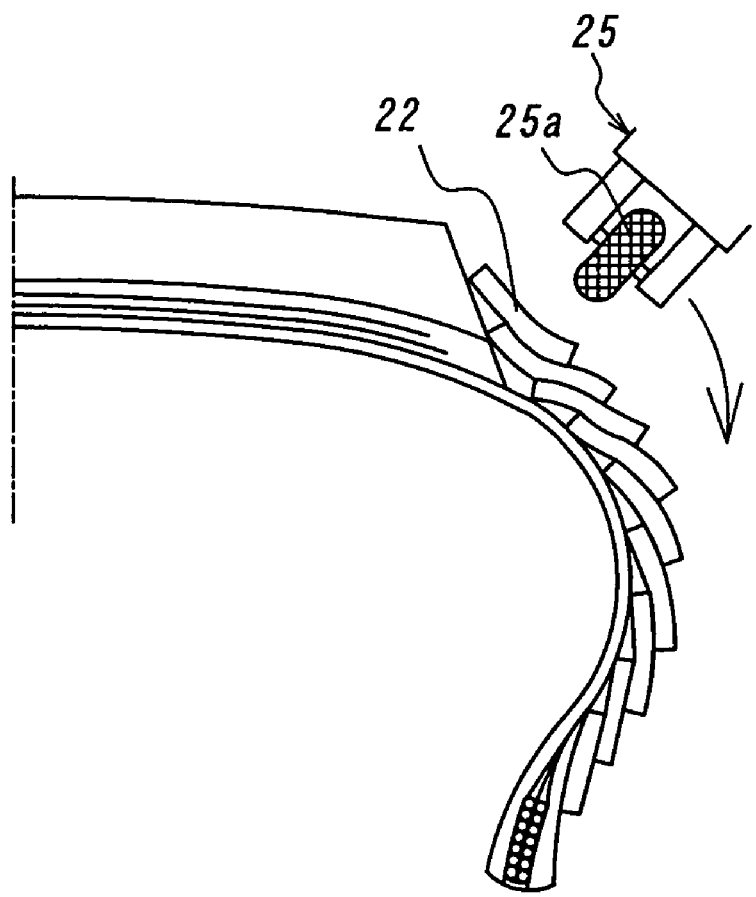
FIG. 6 is a side view of a flattening roller of the green tire builder.
Figure 7:
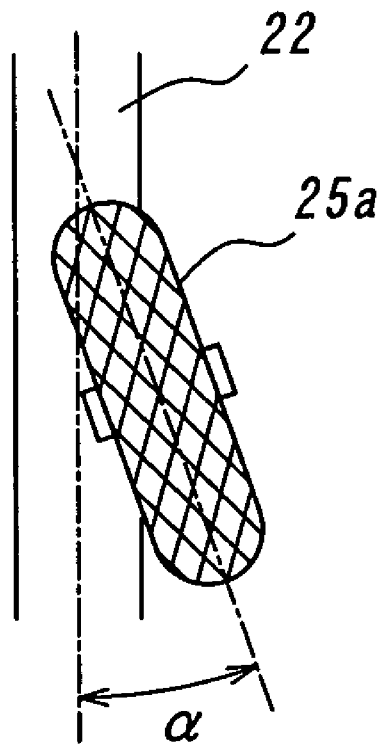
FIG. 7 is a plan view of a roll of the flattening roller of the green tire builder.

The above-mentioned step of helically winding and laminating the rubber strip 22 on the rigid core 21, and the step of flattening a projection of a stepped portion produced by one part of the rubber strip 22 wound on the rigid core 21 and another part of the rubber strip overlapping thereon under pressure may be substantially simultaneously performed, as shown in FIG. 5. Otherwise, the rubber strip 22 may be wound for building a single tire component member, subsequently, the above-mentioned projection produced in the tire component member may be flattened under pressure, and these winding and flattening operations may be sequentially performed for building all of the tire component member, as shown in FIG. 6. Although the rubber strip 22 is drawn in FIG. 5 to be wound on an outer surface with a maximum diameter of the rigid core 21 for illustrative convenience, the rubber strip is actually wound with a gradient in relation to the paper face when the side wall is to be built.

FIG. 4 shows a state where the extending direction of the rubber strip 22 and the rotational direction of the roller 25a of the flattening roll 25 are identical. An angle α formed between the extending direction of the rubber strip 22 and the rotational direction of the roller 25a, however, can be appropriately varied from 0 to 30 degrees to produce a shear stress between the roller 25a and the rubber strip 22 in the rotational direction of the roller 25a, which further improves the flattening effect. Moreover, a surface property of the roller 25a and a shape of the roller 25a can be appropriately varied to further improve the flattening effect.

In addition, although the roller 25a of the flattening roll 25 can rotate freely, the flattening effect can be further improved when the flattening is effected while the roller is rotationally driven to have a rotational speed different from that of the rigid core. If the difference in rotational speed between the roller 25a and the rigid core 21 is set to be 0-30% of the rotational speed of the rigid core, a shear stress is produced in the rotational direction of the rigid core 21, so that the flattening effect is further improved.

The descriptions in the above relate to the structure of the green tire builder 20 and the method for manufacturing a tire using the green tire builder 20. When the rigid core 21 of the green tire builder 20 is, however, replaced with a tire component member forming drum, the green tire builder 20 can be varied in design suitable for an apparatus of manufacturing a tire component member. In the apparatus of manufacturing a tire component member, as is the case with the green tire builder 20, an effect on winding the rubber strip and flattening the projection under pressure can be achieved.

EXAMPLES

The green tire builder 20 is made according to the present invention, and a tire is experimentally manufactured by vulcanizing a green tire having side walls produced by winding the rubber strip with the green tire builder 20. Evaluations are made on height of the projection at stepped portion of the side wall of the green tire, incidence rate of embedded contaminants at the side wall of the product tire, and the durability of the product tire for each of a tire in which the projection of the green tire is flattened under pressure (hereinafter referred to as "tire X") and a tire in which the projection is not flattened under pressure (hereinafter referred to as "tire Y"). The detail is described below.

Side walls are built by helically winding and laminating the rubber strip 22 with the green tire builder 20 shown in FIG. 1 to build a green tire. Thereafter, the green tire is vulcanized to give both of the tires X and Y. Thus, both tires are completely identical in their structure, but different in that the tire X is flattened under pressure by the flattening roller while the tire Y is not flattened under pressure in the process of building the green tire.

Figure 8:
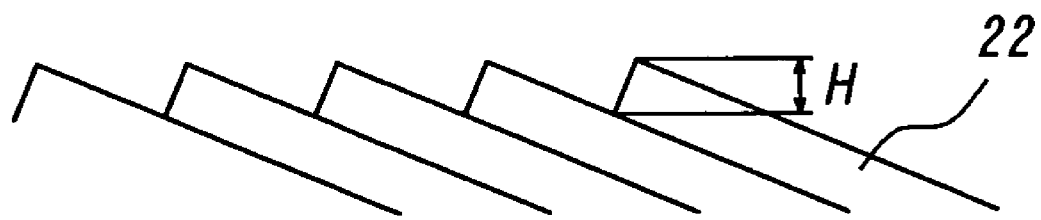
FIG. 8 is a diagram showing a projection of a stepped portion of the rubber strip.

Table 1 shows a range of the respective height H of the projection measured at the stepped portion of the green tire, as shown in FIG. 8, of the tires X and Y.

In this measurement, employed is an embodiment in which the rotational direction of the roller 25a of the flattening roll 25 is set to 10 degrees with reference to the extending direction of the rubber strip on the rigid core 21, and the winding of the rubber strip 22 and the flattening of the projection under pressure are substantially simultaneously performed.

TABLE 1

|  | Projection Height H |
| --- | --- |
| Tire X | 0.2-0.3 mm |
| Tire Y | 0.5-0.7 mm |

According to Table 1, a projection height in the tire X is more than a half of that in the tire Y, so that it is perceived that the above-mentioned occurrences of bare, residual air and embedded contaminants can be suppressed, which can improve the durability of a product tire.

Figure 9:
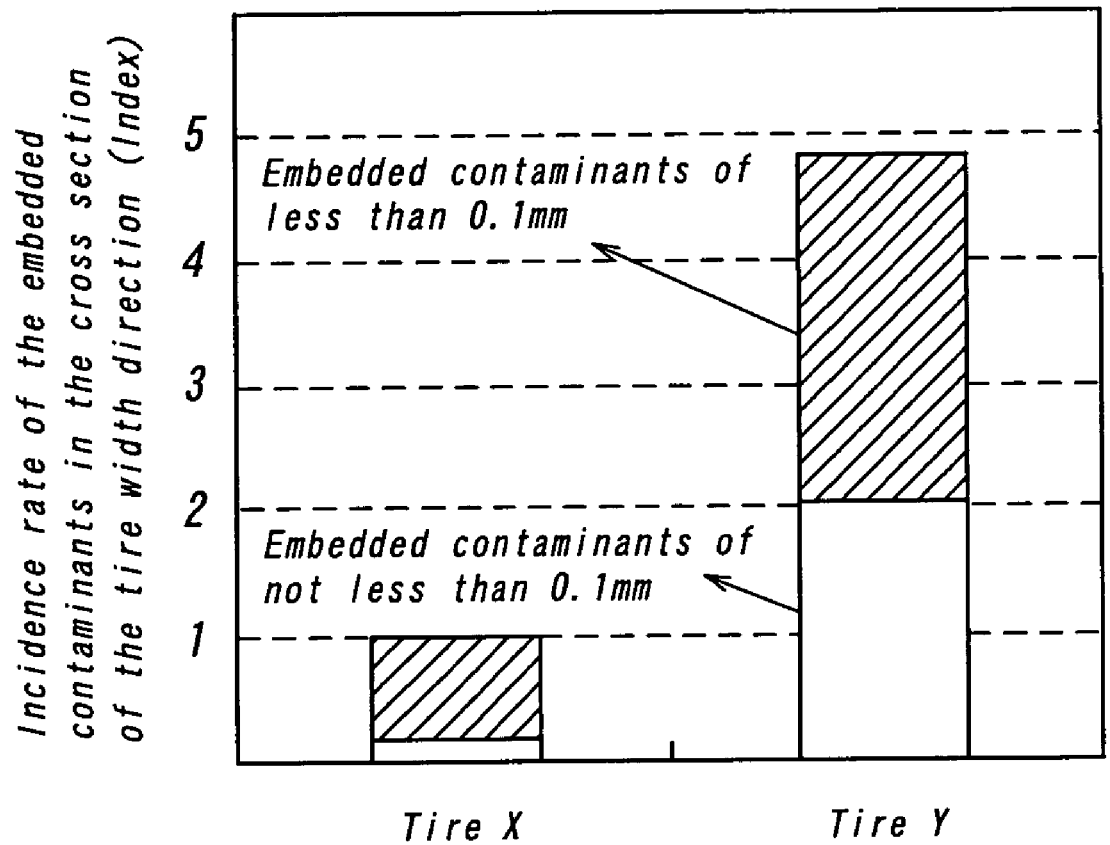
FIG. 9 is a graph showing an incidence rate of embedded contaminants in a cross section along the width direction of the tire.
Figure 10:
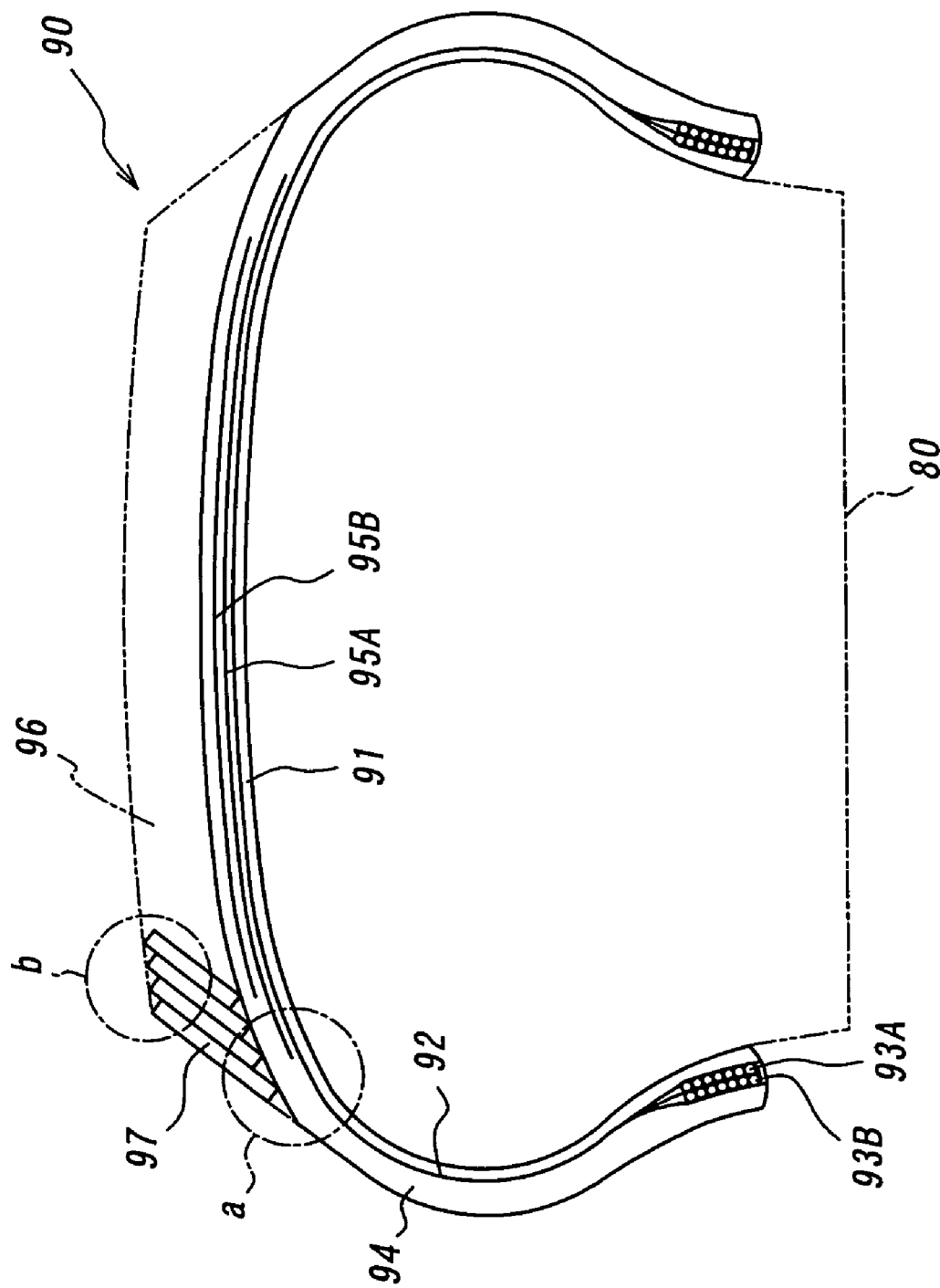
FIG. 10 is a cross section of a green tire built by winding and laminating a conventional rubber strip.
Figure 11A:
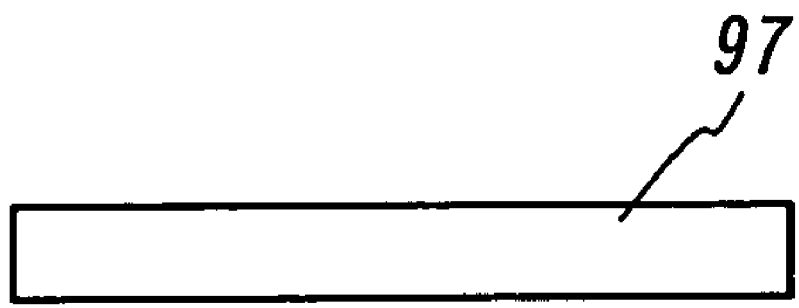
FIGS. 11a and 11b are cross-sectional view of the conventional rubber strip.
Figure 11B:
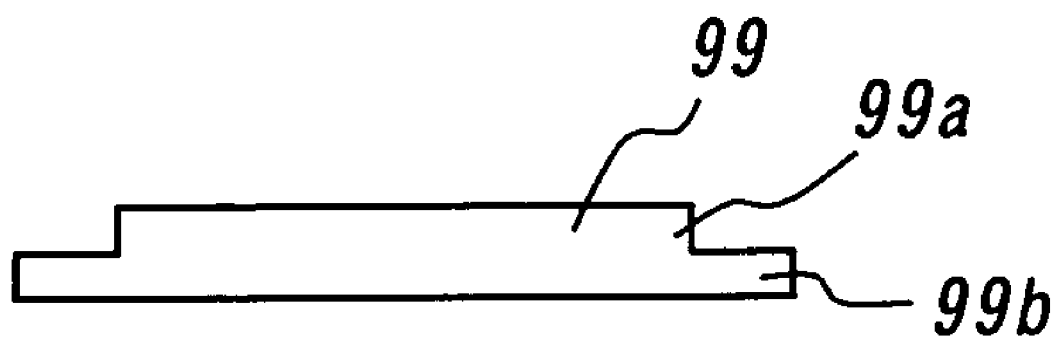
Figure 12A:
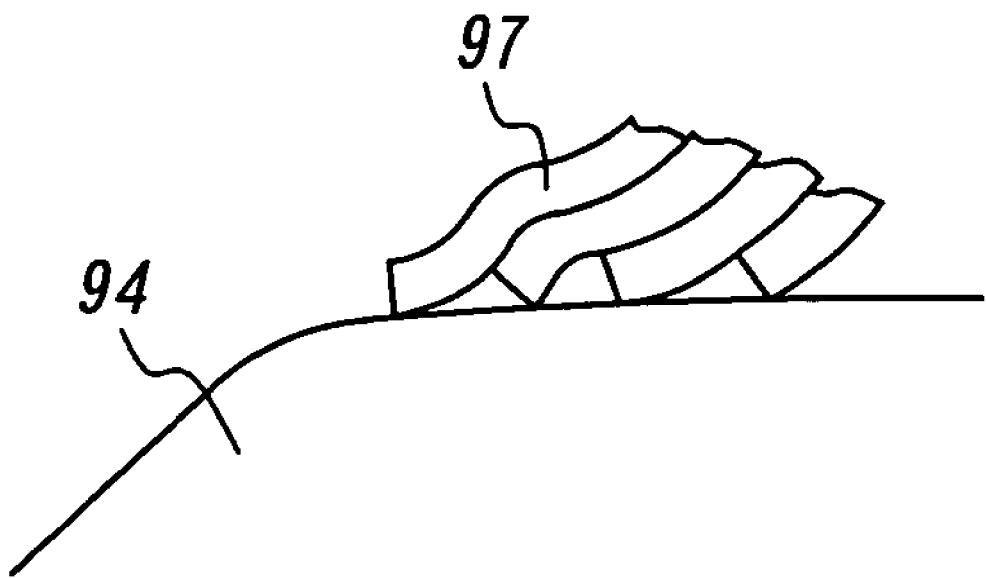
FIGS. 12a and 12b are cross-sectional views showing portion a and portion b of FIG. 10, respectively.
Figure 12B:
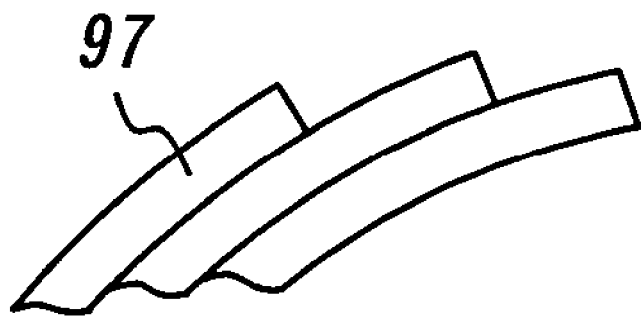
Figure 13A:
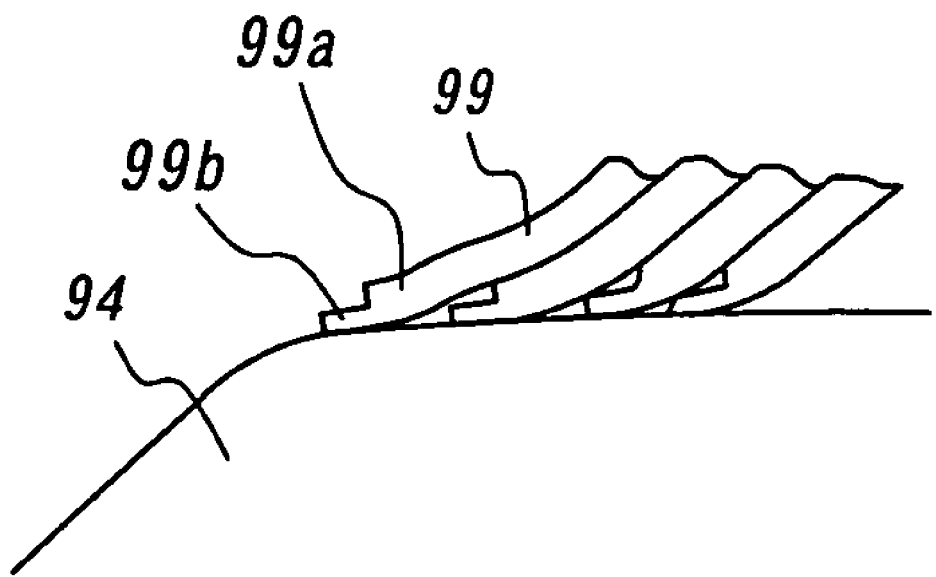
FIGS. 13a and 13b are cross-sectional views showing portions corresponding to portion a and portion b of FIG. 10, respectively, of green tires each built by using different kinds of conventional rubber strips.
Figure 13B:
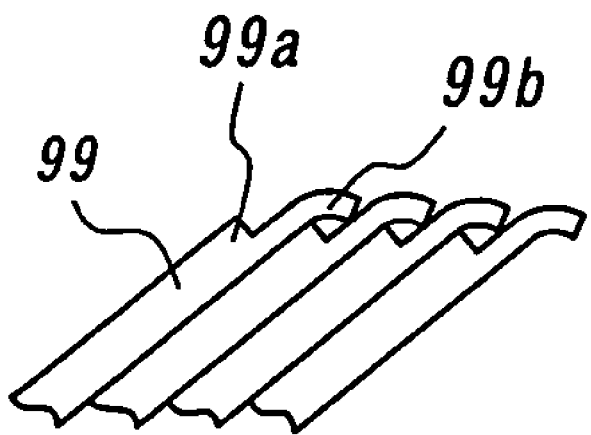

FIG. 9 is a graph showing a result of evaluation on the respective incidence rate of the embedded contaminants in the cross section of the tire width direction for the tires X and Y. "Incidence rate of the embedded contaminants in the cross section of the tire width direction" shown in the ordinate is an index obtained by cutting the tire along the meridian plane, counting the total number of the embedded contaminants appeared in the side wall of the cut section, averaging the total number for a given numbers of the meridian plane to give an average embedded contaminants per cut section and then converting the averaged value of the embedded contaminants per cut section provided that the index for the tire X is 1. Incidence rates of the embedded contaminants of not less than 0.1 mm and less than 0.1 mm are calculated in the similar operation, and a detail of the embedded contaminants in terms of their size is also shown.

As shown in FIG. 9, the tire X gives a distinctly better result than the tire Y for the embedded contaminants both of not less than 0.1 mm and less than 0.1 mm, so that the durability of the product tire can be improved.

Actual tests for the durability were conducted on the tires X and Y. In this test, according to U.S. FMVSS (Federal Motor Vehicle Safety Standards) No. 109, the tires X and Y were tested by a step load method, i.e. a method in which speed is increased by every 30 minutes, to give speed at which the tires were broken and time for which the test had been conducted. The results were indexed and shown in Table 2 below with the result of the tire Y being 100. As shown in Table 2, the tire X was improved in the durability as compared with the tire Y.

TABLE 2

|  | The durability |
| --- | --- |
| Tire X | 130 |
| Tire Y | 100 |

INDUSTRIAL APPLICABILITY

According to the present invention, an amount of a step in a stepped portion formed with one part of the rubber strip and another part of the rubber strip overlapped thereon and residual air can be reduced prior to vulcanization, so that possible problems in a product tire caused by occurrences of bare and a flow crack, residual air and embedded contaminants can be suppressed to improve the durability of the product tire. Moreover, the present invention can be applied to a case where a tire component member is built on a tire component member forming drum in addition to a case where a green tire is built by winding and laminating a rubber strip on a rigid core or a building drum.

The invention claimed is:

1. A method for manufacturing a tire, comprising:
    building a desired green tire by helically winding and laminating a rubber strip on a rigid core or a building drum;
    moving a rubber strip winder so that the rubber strip winder is being constantly located at a given position with reference to the rigid core or the building drum;
    setting a flattening roll such that roller of the flattening roll is rotationally driven to have a rotational speed different from that of the rigid core or the building drum, the difference in rotational speeds between the rigid core or the building drum and the roller of the flattening roll being set to be greater than 0% to about 30% of a rotational speed of the rigid core or the building drum; and
    flattening a projection of a stepped portion produced by one portion of the rubber strip and another portion of the rubber strip overlapping thereon under pressure by the flattening roll, a surface of a roller of the flattening roll being moved so that the roller of the flattening roll is being constantly located at a given position with reference to the rigid core or the building drum.

2. The method for manufacturing a tire according to claim 1, wherein, the rubber strip is wound in order to build a tire component member, the projection produced in the tire component member is subsequently flattened under pressure, and the winding and the flattening under pressure are sequentially performed for building all of the tire component members.

3. A method for manufacturing a tire component member, comprising:
    building a desired tire component member by helically winding and laminating a rubber strip on a tire component member forming drum;
    moving a rubber strip winder so that the rubber strip winder is being constantly located at a given position with reference to the rigid core or the building drum;
    setting a flattening roll such that the roller of the flattening roll is rotationally driven to have a rotational speed different from that of the tire component member forming drum, the difference in rotational speeds between the tire component member forming drum and the roller of the flattening roll being set to be greater than 0% to about 30% of a rotational speed of the tire component member forming drum; and
    flattening a projection of a stepped portion produced by one portion of the rubber strip and another portion of the rubber strip overlapping thereon under pressure by the flattening roll, a surface of a roller of the flattening roll being moved so that the roller of the flattening roll is being constantly located at a given position with reference to the tire component member forming drum.

4. The method for manufacturing a tire component member according to claim 3, wherein the winding of the rubber strip and the flattening of the projection under pressure are performed substantially simultaneously.

5. The method for manufacturing a tire component member according to claim 3, wherein, the rubber strip is wound, and subsequently the projection is flattened under pressure.

* * * * *